March 12, 1957     D. J. HEIDINGER     2,784,833
CHAIN LINK CONVEYOR
Filed June 5, 1953     2 Sheets-Sheet 1
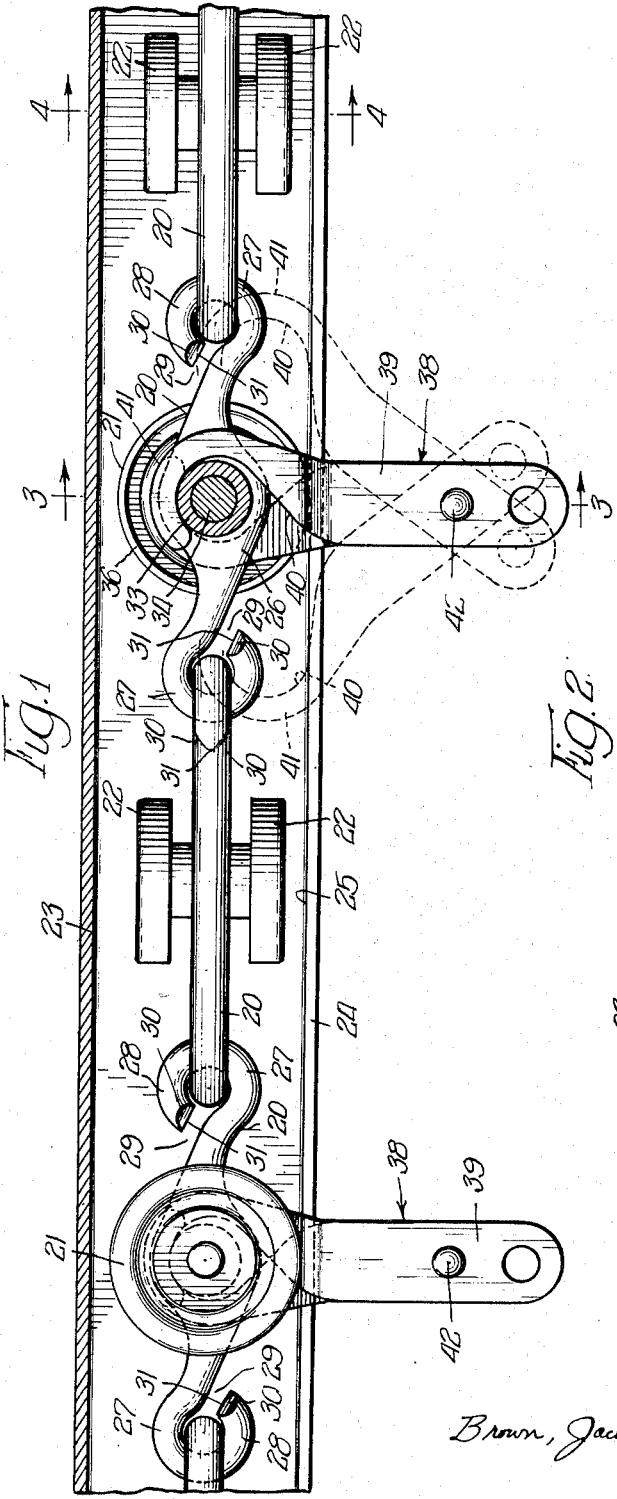
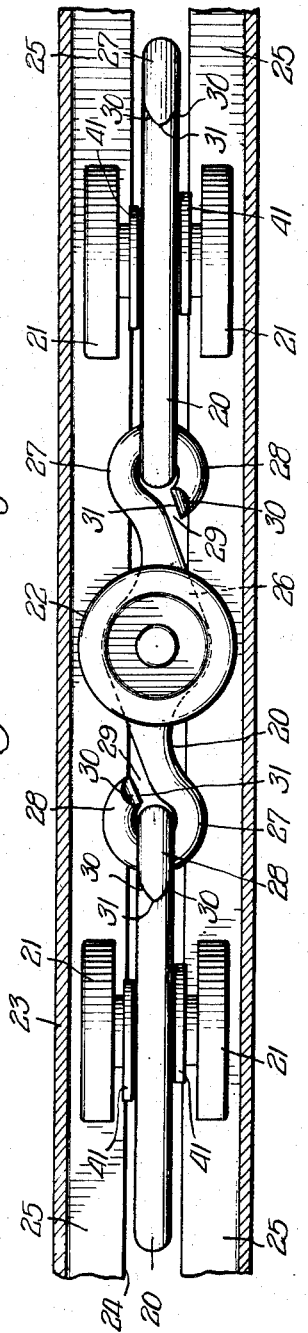
INVENTOR.
Del J. Heidinger,
BY
Brown, Jackson, Boettcher & Dienner
ATTYS

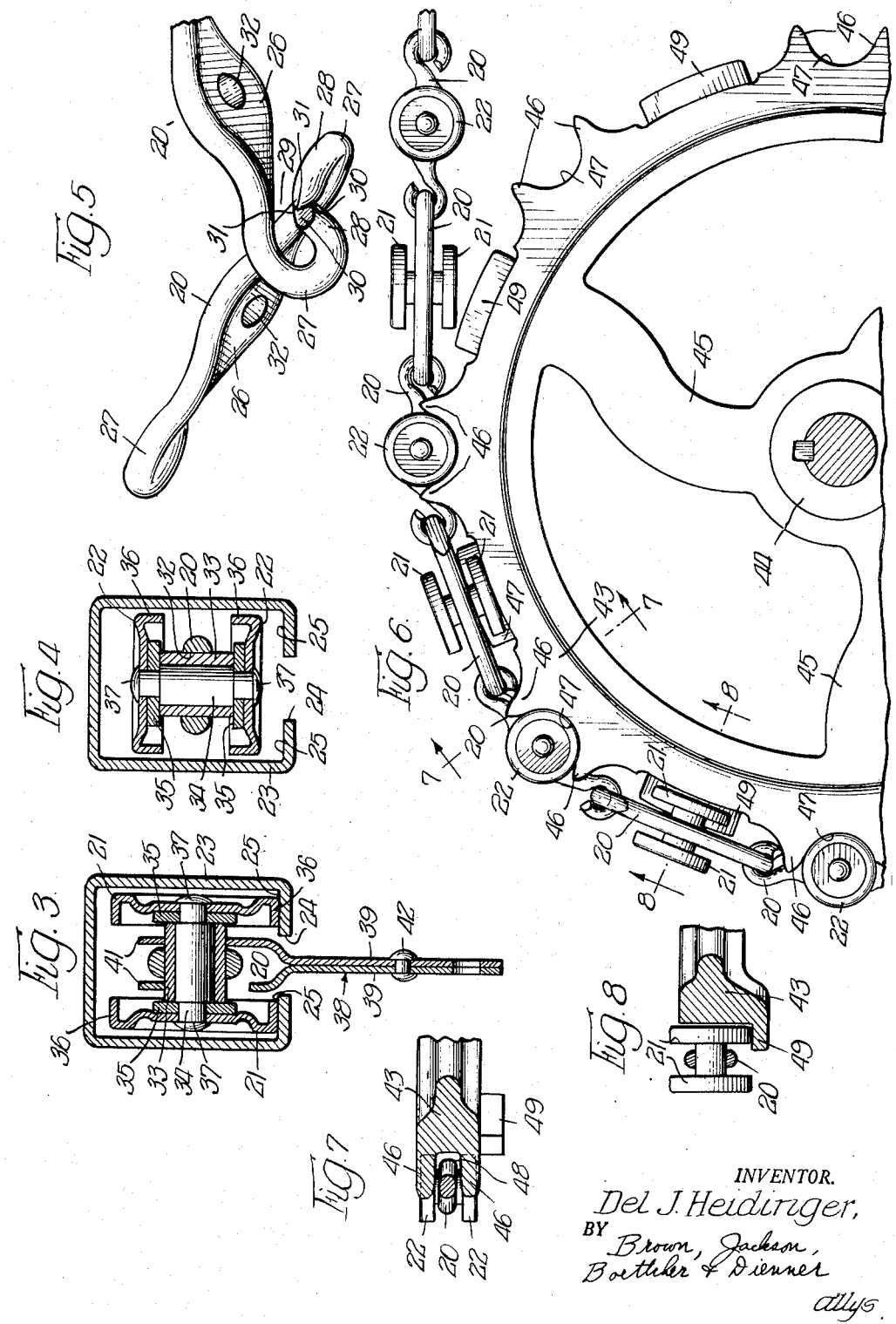

United States Patent Office 2,784,833
Patented Mar. 12, 1957

2,784,833

CHAIN LINK CONVEYOR

Del J. Heidinger, Aurora, Ill., assignor to Richards-Wilcox Manufacturing Company, Aurora, Ill., a corporation of Illinois Application June 5, 1953, Serial No. 359,762

11 Claims. (Cl. 198—177)

The present invention relates to conveyors of the endless chain type, adapted to travel along a supporting or guide track. In general, the invention relates to endless chain conveyors of the character disclosed in Patent No. 2,372,199, issued March 27, 1945, to Paul M. Hassler, which patent is assigned to the assignee of the present application.

The conveyor disclosed in the above identified patent comprises an endless chain made up of alternately disposed wheeled links of two types, the first being a bifurcated link carrying a pair of wheels, and the second being a closed loop within which a wheel is journaled. The two types of links are joined by pivot pins extending between the bifurcations of the first links at each end thereof and through the adjacent loop end of the links of the second type, whereby the wheels on the two types of links are disposed on axes at right angles to one another. The chain as thus assembled is adapted to be supported and/or guided in a box-like housing, wherein the wheels on one set of links are disposed for engagement with one set of opposite walls of the box and the wheels on the other set of links are disposed for engagement with the other set of opposite walls of the box, whereby the chain is supported and guided both horizontally and vertically in the box-like housing. The resultant assembly is very efficient in use and exhibits many capabilities theretofore unattained in the art.

It is an object of the present invention to provide an improved conveyor of the general character defined, including the box-like housing and the vertical and horizontal wheels disposed in alternate relation in the housing.

It is also an object of the present invention to provide an improved conveyor of the above character that is more economical of construction, more readily assembled, especially in the field, and more practical and efficient in use.

In particular, it is an object of the invention to provide improved link means for chain conveyors of the character defined whereby a plurality of links of identical construction may be assembled together to provide an endless chain and wherein the links alternately provide support for the horizontal and vertical wheels, the wheel mounting in both cases being the same.

A further object of the invention is the provision of improved link means for chain conveyors comprising a unitary member having a central portion adapted to support a wheel axle, and loop end portions, the loop end portions being open adjacent the central portion whereby the same are adapted for the ready assembly therewith of the loop end portions of other links of the same construction to provide an endless chain.

A still further object of the invention is the provision of improved link means of the character above defined wherein the openings between the loop end portions and the central portion of the link are smaller than the cross section of the loops and wherein the free end of each loop is of a reduced dimension, the arrangement being such that adjacent links can be assembled only when disposed in certain relative positions, which positions cannot be attained by the links themselves during use of the endless chain formed thereby.

By providing improved link means in accordance with the foregoing objects, the present invention achieves several advantages over prior proposals in the art, among which are the following: First, the links are all identical thereby reducing manufacturing and assembly problems; second, the links themselves are unitary members requiring no subassembly; third, the wheel mounting on each link is identical (although the vertical and horizontal wheels themselves may be of different sizes); fourth, due to the open loop portions, the links are assembled directly to one another in a ready and convenient manner without the necessity for connecting members such as pintle pins, thus providing such convenience of assembly of an endless chain that the links can be supplied to a user as individual members for assembly by him in the field to his specifications; fifth, the provision of an arrangement wherein assembly of adjacent links is effected in relative positions which cannot be achieved by the links in subsequent use of the resulting chain prevents accidental uncoupling of the chain; sixth, the joining of the links through relatively small loop portions provides a chain that is capable of flexing or bending in all directions about a relatively short radius; and seventh, the provision of unitary links assembled directly to one another accommodates a shortening of each link to decrease the radius required for a vertical or horizontal turn.

An additional object of the present invention is the provision of an improved chain link and wheel assembly for chain conveyors whereby load supporting attachment links may readily be coupled to and uncoupled from the chain without disassembly of the chain, by the detachable association of a load supporting link with the wheel axle carried by a chain link.

It is also an object of the present invention to provide drive means for chain conveyors of the character defined including an improved sprocket adapted to establish driving connection with some of the links of the chain and to provide support for the other links.

Other objects and advantages of the present invention will become apparent in the following detailed description of a preferred embodiment of the invention.

Now, in order to acquaint those skilled in the art with the manner of making and using the chain conveyor of the present invention, I shall describe, in connection with the accompanying drawings, a preferred embodiment of the invention and a preferred manner of making and using the same.

In the drawings:

Figure 1 is a side view, partly in section and partly in elevation, of the conveyor of the present invention;

Figure 2 is a top view, partly in section and partly plan, of the apparatus shown in Figure 1;

Figure 3 is a vertical cross sectional view of the guide track, a vertical wheel and link assembly and a work support, the view being taken substantially on line 3—3 of Figure 1;

Figure 4 is a vertical cross sectional view of the guide housing and a horizontal wheel and link assembly, the view being taken substantially on line 4—4 of Figure 1;

Figure 5 is a perspective view of two of the chain links of the invention showing the manner in which the links are assembled and disassembled;

Figure 6 is a partial plan view, on a reduced scale, of the conveyor chain and conveyor drive sprocket of the invention;

Figure 7 is a fragmentary vertical section taken substantially on line 7—7 of Figure 6 and showing the toothed engagement of the sprocket with the horizontally disposed wheels of the conveyor chain; and Figure 8 is a fragmentary vertical section taken substantially on line 8—8 of Figure 6 and showing the support provided for the vertically disposed wheels of the chain in their passage over the sprocket.

Referring now to the drawings and particularly to Figures 1 and 2, it is seen that the conveyor chain of the present invention comprises a plurality of link members 20 pivotally linked to one another, with alternate links being disposed vertically and the other or connecting links being disposed horizontally. The vertically disposed links each carry a pair of vertical wheels 21 and the connecting links each carry a pair of horizontal wheels 22. The chain, including the links and wheels, is disposed within a supporting track or housing 23 which, as shown in Figures 3 and 4, is of box-like configuration in cross section. As shown in the drawings, the housing or track 23 would be mounted as an overhead conveyor. However, a housing may be inverted from the position shown and secured to a floor or the like to provide a floor surface conveyor, or it may be mounted on either of its sides. For convenience of description herein, the conveyor will be referred to principally as an overhead conveyor, it being understood, of course, that resort may be had to any of the mountings referred to above within the spirit and scope of the following description and the present invention. As shown, the box-like housing or enclosure 23 is provided with a longitudinal slot 24 in the bottom wall thereof. The vertical wheels 21 of the chain ride upon the bottom wall of the housing, one to each side of the slot, and the horizontal wheels 22 are adapted to ride against the side walls of the box, thus to provide substantially frictionless movement of the chain through the track. The box-like track or housing may be curved horizontally and/or vertically to guide the conveyor chain along any desired path, as is known from the disclosure of Patent No. 2,372,199 referred to hereinbefore. The housing 23 and the wheels 21 and 22 are so designed with respect to one another that the housing provides an accurate, but non-binding guide for the chain. In other words, the diameters of the wheels 21 and 22 are slightly less than the corresponding cross sectional dimensions of the box. The longitudinal slot 24 in the track 23 is preferably formed centrally of the bottom wall so as to provide a flange or load supporting runway 25 to each side thereof upon which the vertical wheels run. This construction of track is relatively inexpensive to make from sheet metal stock. The finished track sections may be supplied in any appropriate lengths, either in straight sections or in sections curved horizontally to the right or to the left, or in sections curved vertically either upwardly or downwardly. The sections are secured to the building structure by brackets, hangers, or in any suitable manner, and the abutting ends of the sections are secured together by suitable joint brackets. The enclosing of the chain elements entirely within this type of track affords numerous advantages, such as an improved appearance, protection from dust and dirt, a minimum possibility of any material becoming entangled in the chain, and a minimum possibility of an operator's hand or any part of his person becoming caught in the chain.

The improved chain links 20 provided by the present invention are all identical and each comprise a unitary member. The manner in which and the material from which the links are made may be varied within wide limits to meet particular requirements, but the same preferably comprise metal castings. Each link includes a central or body portion 26 and a loop end portion 27 at each end of the central portion. The link thus formed is preferably flat in plan view and generally oblong in side elevation. Each loop end portion 27 comprises a generally C-shaped hook formed of stock that is substantially circular in cross section, one end of the C-shaped hook being integrally joined to the central portion 26 of the link and the other end 28 thereof being spaced from the central portion 26 to define an opening 29 in the loop. Each of the C-shaped hooks is looped upon itself through an arc preferably in excess of 270°. It should also be noted that the two C-shaped hooks 27 face in opposite directions at opposite ends of the link, so that the opening 29 in one C-shaped hook faces outwardly in one direction from one edge of the link, and the opening 29 in the other C-shaped hook faces outwardly in the opposite direction from the opposite edge of the link. The opening 29 in each loop 27 is adapted to accommodate the ready connection of the adjacent loop end portions of two links whereby a chain of the links may be formed in a convenient manner in the field, without any necessity for shop assembly of the links.

As pointed out hereinbefore, it is an object of the present invention to provide chain links adapted to be connected in a convenient manner and at the same time exhibiting the advantageous characteristic that the links cannot inadvertently or accidentally become uncoupled or disconnected in use of the chain. To this end, the opening 29 and the free end 28 of each loop 27 are so formed as to accommodate assembly of two links only when the same are disposed in relative positions that cannot be attained by the links themselves when the same are assembled and in use as a chain. Specifically, the opening 29 in each loop is smaller than the material of the loop whereby one loop cannot be passed directly through the opening in another loop. In other words, the space 29 between the free end 28 of the loop and the body portion 26 is less than the thickness of the major portion of the loop. This space or opening 29 is also less in width than the diameter of the hook eye to which it affords access, and is less in width than the transverse thickness of the companion connected link. The free end 28 of each loop 27 is specially formed so that the same is of a reduced cross section. In particular, the free end 28 is inclined inwardly from the opposite sides of the link, as is indicated at 30, to present a generally pointed free edge 31. By then disposing two links in the relative positions shown in Figure 5, wherein the pointed end 31 of each loop is disposed in alignment with the opening 29 in the other loop, with the planes of the two links at right angles to one another and the two links offset from a straight line by approximately 30° both vertically and horizontally, the ends of the respective loops may be passed through the opening in the other. Then, to dispose the two links in a straight line, it is necessary to move each of the links approximately 180° in their respective planes with respect to one another, whereby the same become assembled in end to end relation as is shown in Figures 1 and 2. When thus assembled, the two links, being flat, have the planes thereof disposed at right angles to one another. Obviously, in any use to which a chain thus assembled may be put, two adjacent links cannot both move 180° in their respective planes with respect to one another, and thus the same can never become disconnected in use. Yet, connection and disconnection of the links can readily and easily be effected manually.

Each of the links 20 is adapted to carry one or more wheels, and I preferably provide two wheels on each link, one to either side thereof. To provide a mounting for the wheels, each link 20 is provided with a hole or aperture 32 therethrough disposed transversely of the plane of the link, and a bushing 33, formed of brass, or comprising an oilite bearing or the like, is press-fitted in the aperture. The bushing 33 is of a length greater than the thickness of the link and the same extends equal distances to either side of the link. The bushing 33 provides a journal within which a wheel shaft or axle 34 is rotatably mounted, the shaft being longer than the bushing and extending equal distances to either side thereof. The shaft 34 preferably includes an enlarged central portion of substantially the same length as the bushing 33 journaled in the bushing and reduced end portions upon each of which a filler disc 35 is mounted. Each of the wheels 21 and 22 comprises a metal stamping or the like having an inwardly turned cylindrical flange 36 defining the tread or rim portion of the wheel. The diameter of each wheel is greater than the width of the links and less than the length of the links, and each wheel is provided with a central aperture so that the same may be slipped onto a reduced end portion of a wheel shaft 34, the wheel being secured to the shaft by peening the extending end portion of the shaft over against the outer surface of the wheel, as is indicated at 37. The filler discs 35 are thus confined between the wheels and the shoulders on the axle, whereby the axle and the two discs and the two wheels thereon form a unitary rotary assembly journaled in the bushing 33. The filler discs 35 serve to space the wheels outwardly of the bushing for a purpose to be described hereinafter.

From the foregoing, it will be appreciated that the wheels on each link are disposed in spaced parallel relation to the link so that when a plurality of link and wheel assemblies are connected together, the wheels on adjacent links will be disposed at right angles to one another, thus to provide the vertical and horizontal wheels as described hereinbefore. The vertical and horizontal wheels 21 and 22, respectively, may both be of the same size if desired, in which case all of the link and wheel assemblies making up a chain would be identical. However, the track or housing 23 conventionally is of rectangular rather than square cross section with the major dimension thereof disposed vertically. In view of this fact, the vertical wheels 21 are preferably of greater diameter than the horizontal wheels 22 so that the wheels are conformably received within the housing. This leads to certain known advantages, and also to a shortening of the links, for turning about shorter radii, due to the lack of interference between the wheels. Also, the vertical whels are the load supporting wheels, whereas the horizontal wheels serve only as a side guide. With the exception of the wheels then, the formation of each link and wheel assembly is identical, different size wheels being used in the horizontal and vertical link assemblies, respectively.

In manufacture, the link and wheel assemblies are made in the manner described, and two lots or groups of link assemblies, one of horizontal links and one of vertical links, are provided the user for assembly in a chain by him in the field or at the place of use, to his specifications. The track or housing 23 within which the chain is enclosed and guided is supplied the user in sections, straight lengths, curves, etc., for assembly on the job. This results in substantial savings in original cost, shipping charges and so on and leads to the provision of a custom made conveyor for each installation, whereby the particular requirements of each installation are readily met. The provision of unitary links adapted to be directly assembled to one another leads to several advantages including reduced material and manufacturing costs, reduced cost of assembly of each link and wheel unit, reduced cost of assembly of a chain since no connecting means, such as pintle pins, are required, and a shortening of each link. The pivotal interconnection of the links by the loop portions thereof accommodates a wide arc of relative movement in both the horizontal and vertical planes, approximately 270° in each plane. Also, the loop connection accommodates adequate twisting of the links to compensate for any irregularities of the track and at the same time prevents such amount of twisting as could possibly result in damage to the chain or the track. The resultant chain assembly is thus adapted for movement around curves of a very short radii in both the vertical and horizontal planes.

The conveyor chain formed as described hereinbefore and mounted in the guide track or housing is adapted to convey various articles about a given path. To provide means for attaching the articles to the chain, a plurality of work supports 38 are connected to the chain and depend therefrom through the slot 24 in the housing 23.

The work supports or pendants 38 are adapted to be detachably connected to the vertical wheel and link assemblies and each comprise a pair of identical pendant sides 39. Each pendant side 39 comprises a main portion and an offset end portion, a pair of spaced holes being provided in the main portion, and a transverse slot opening 40 being provided in the offset end portion. The slot opening 40 is so formed that the offset end portion in effect comprises a C-shaped hook 41. Two of the pendant sides 39 are assembled in parallel but opposite relation so that the offset end portions thereof are spaced apart and the slot openings therein are disposed in opposite directions. As thus assembled, the two sides are pivotally connected together by means of a rivet or pivot pin 42 passing through aligned holes in the center of the main portion of the two sides. The end portions or hooks 41 of the pendant sides are spaced apart by a distance slightly greater than the thickness of the links 20 and slightly less than the spacing between the filler discs 35 or wheels mounted on the link.

To provide an optimum mounting for the load supports or pendants 38, the present invention provides the wheel and link assembly wherein the bushing 33 is exposed to the opposite sides of the link and is not obstructed by the wheels. The purpose of the filler discs 35 is to space the wheels from the bushing so that the tread portions 36 thereof do not overlie or obstruct the bushing. To secure a work support or pendant 38 to a vertical link and wheel assembly, it is merely necessary to pivot the pendant sides apart, as shown in dotted lines in Figure 1, insert the same through the slot 24 in the housing 23, line the same up with the bushing 33 of one of the vertical link assemblies, and pivot the pendant sides back into parallel relation. In so doing, the hooks 41 will engage the bushing from opposite sides and hook onto the bushing to provide, in effect, an annulus surrounding the bushing, whereby the work support is locked to the bushing, as is shown in solid lines in Figures 1, 2 and 3. The lower end of each pendant, due to the provision of the aligned holes therein, is adapted for the reception of a hook or the like for supporting articles, the passage of a hook or the like through the aligned holes serving to lock the pendant to the wheel assembly. A pendant 38 may be secured to each of the vertical wheel assemblies, or may be secured to some of the vertical wheel assemblies at any desired spacing, according to the requirement of the user. At any time, the spacing between pendants can readily be changed to accommodate various articles to be conveyed. Due to the mounting of the pendants on the bushings, and thus in effect the wheel axles, any load carried by the pendants is optimumly supported centrally of a pair of vertical wheels.

Referring now to Figures 6, 7 and 8, I have shown therein the improved chain drive sprocket provided by the invention. The sprocket comprises an annular ring 43 joined to a central hub 44 by means of a plurality of arms 45. In plan view, Figure 6, the ring 43 presents a plurality of pairs of radially extending teeth 46, which pairs of teeth are circumferentially spaced apart by a distance equal to the spacing between the horizontal wheel assemblies of the chain. Each pair of teeth presents therebetween a recess 47 complementary to the periphery of the horizontal wheels 22 adapted for the reception of the wheels to drive the chain. As viewed in section, Figure 7, each pair of teeth 46 is slotted radially to provide an intermediate recess 48 within which the horizontal links 20 of the chain are received and to provide two vertically aligned pairs of teeth, each pair being adapted to engage one of the wheels carried by each horizontal link. Intermediate the pairs of teeth 46, and on a circumferential spacing equal to the spacing between the vertical wheel assemblies, the ring 43 of the sprocket presents a plurality of radially extending horizontal ledges 49. The ledges 49 extend radially from the sprocket in parallel but vertically offset relation to the teeth and the plane of the sprocket. In use, the ledges are disposed to engage the lower portion of the inside wheel of each vertical link assembly to support the vertical wheels and the load carried thereby, as shown in Figure 8. Thus, the sprocket not only drives the chain, but supports the same in its passage around the sprocket.

In use, the drive sprocket is preferably disposed at one of the curves the conveyor is to take and the housing or guide track at this point presents a gap within which the sprocket extends. The sprocket is rotatably driven by suitable means (not shown) of a conventional type. The teeth 46 on the sprocket engage the horizontal wheels of the chain and drive the chain due to such engagement. At the same time, the ledges 49 support the vertical wheel assemblies and the load carried thereby, whereby the supporting runways 25 provided by the housing 23 are not required to support the chain in its travel about the sprocket.

From the foregoing, it will be appreciated that the present invention provides an improved chain conveyor, an improved chain for the conveyor, improved wheel and link assemblies for the chain, improved chain links, an improved mounting of the work supports, and an improved driving sprocket for the chain, which improvements exhibit the particular advantages of extreme economy and practicality in manufacture and assembly, and simplicity and efficiency in use.

While I have described what I regard to be a preferred embodiment of my invention, it will be appreciated that various changes, rearrangements and modifications may be made therein without departing from the scope of the invention, as defined by the appended claims.

I claim:

1. A link for chain conveyors of the type providing alternately disposed horizontal and vertical wheels adapted to ride within an enclosing track, consisting of a generally flat unitary member having a central portion and a loop end portion at each end of said central portion, said central portion being apertured to receive a wheel axle, each of said loop end portions consisting of a generally C-shaped hook joined integrally to said central portion at one end thereof, extending in an arc in excess of 270 degrees from said one end portion thereof and terminating in spaced relation to one edge of said central portion to define an opening in the hook along one edge of said central portion, the two C-shaped hooks at opposite ends of each link facing in opposite directions so that the openings in the two hooks face outwardly from opposite edges of the link, said two C-shaped hooks being adapted for establishing coupling connection with identical C-shaped hooks on companion connecting links, the opening in each C-shaped hook being of a dimension less than that of the major portion of the hook, less than the diameter of the eye within the hook, and less than the transverse thickness of the companion connecting link, and the terminal end of the hook being inclined inwardly from the opposite sides of the link in the plane of the link to define a reduced end portion for angular reception within said opening in the C-shaped hook of a companion link in the operation of coupling said links.

2. A link for chain conveyors of the type providing alternately disposed horizontal and vertical wheels adapted to ride within an enclosing track, comprising a generally flat unitary member having a central portion and a loop end portion at each end of said central portion, said central portion being adapted to support a wheel axle, each of said loop end portions comprising a generally C-shaped hook joined integrally to said central portion at one end thereof and defining substantially a closed loop but being spaced slightly from said central portion at the other end thereof to define an opening along one edge of said central portion facing toward said central portion, said opening in each of said loop portions being adapted for the passage of the loop portion of an identical link, said opening being of a dimension less than that of the major portion of said loop portion, said loop portion at the free end thereof being of reduced section, said loop portion and said opening accommodating assembly of an identical pair of the said links only by disposing the reduced end of each loop in alignment with the opening in the other loop, with the planes of the two links at right angles to one another and the two links offset from a straight line in both planes, passing the two end portions through the two openings, and rotating each of the two links approximately 180 degrees in their respective planes with respect to each other, said loop portion and said opening accommodating disassembly of the pair of links only by reversal of the movements defined, which reversal of movements cannot be attained by the links themselves in any use to which a chain assembled of a plurality of the said links may be put.

3. A link and wheel assembly for chain conveyors comprising a generally flat oblong unitary link member having a central portion and a loop end portion at each end of said central portion, said central portion having an aperture therethrough transversely of the plane thereof, a bushing secured in said aperture and extending to opposite sides of said link member, a wheel shaft journalled in said bushing and extending beyond the opposite ends thereof, a pair of wheels secured to the ends of said shaft, one to each side of said link member in spaced parallel relation to said link member, said wheels being of a diameter greater than the width and less than the length of said link member, and a detachable load support mounted on the extending portions of said bushing to opposite sides of said link member between said link member and said wheels, said load support comprising a pair of members pivotally connected intermediate their ends and spaced apart at one end thereof, the distance between the spaced ends of said members being greater than the thickness of said link member and less than the distance between said wheels, the spaced ends of said members having oppositely disposed transverse slot openings therein receiving the portions of said bushing between said link member and said wheels to opposite sides of said link member, whereby the load support and the load carried thereby are supported solely by said bushing, said shaft and said wheels, and whereby said link member is not required to carry the load and the load support does not bear upon the rotatable components of the assembly.

4. A drive sprocket for chain conveyors of the type providing alternately disposed horizontal and vertical wheels on the chain thereof, said sprocket including a plurality of pairs of teeth extending from the periphery thereof, said pairs of teeth being circumferentially spaced by a distance equal to the spacing between alternate wheels on the chain, said pairs of teeth each defining a recess therebetween complementary to the periphery of the last-named wheels, said recesses being adapted for the reception of the last-named wheels to establish driving connection between the sprocket and the chain, said sprocket intermediate said pairs of teeth including radially extending ledges disposed in parallel offset relation to the plane of the sprocket, said ledges being adapted for engagement with the periphery of the wheels on the chain intermediate the said last-named wheels to support and guide those wheels.

5. A conveyor of the type providing alternately disposed horizontal and vertical wheels, comprising a chain formed of a plurality of connected links, each of said links comprising a generally flat unitary link member having a central portion and a loop end portion at each end of said central portion, said central portion having an aperture therethrough transversely of the plane thereof, a wheel shaft mounted in said aperture and extending to at least one side of said link member, a wheel mounted on said shaft in parallel relation to said link member, said wheels being of a diameter greater than the width and less than the length of said link member, each of said loop end portions being open at one end thereof adjacent said central portion through which opening the loop end portion of a similar link may be passed, adjacent links being disposed with the planes thereof at right angles to one another when connected whereby a chain assembled of said links presents alternately disposed horizontal and vertical wheels, and a sprocket disposed in driving engagement with said chain, said sprocket including a plurality of pairs of teeth extending from the periphery thereof, said pairs of teeth being circumferentially spaced by a distance equal to the spacing between the wheels on alternate links of said chain, said pairs of teeth each defining a recess therebetween complementary to the periphery of the last-named wheels, said last-named wheels being received within said recesses to establish driving connection between said sprocket and said chain, said sprocket intermediate said pairs of teeth including radially extending ledges disposed in parallel offset relation to the plane of the sprocket, said ledges being disposed for engagement with the periphery of the wheels on the links intermediate said last-named wheels to support and guide said wheels.

6. An endless conveyor comprising an elongated track having curves therein, said track being in the form of a housing of box-like cross section, said housing having a longitudinal slot in one wall thereof, a chain movably mounted within said housing, said chain comprising a plurality of connected links, each of said links comprising a generally flat unitary link member having a central portion and a loop end portion at each end of said central portion, said central portion having an aperture therethrough transversely of the plane thereof, a wheel shaft journaled in said aperture and extending to either side of said link member, a pair of wheels secured to said shaft, one to each side of said link member in spaced parallel relation to said link member, said wheels being of a diameter greater than the width and less than the length of said link member, each of said loop end portions comprising a generally C-shaped hook joined integrally to said central portion at one end thereof and being spaced from said central portion at the other end thereof and to define an opening through which the loop end portion of a similar link may be passed, adjacent links being disposed with the planes thereof at right angles to one another, whereby a chain assembled of said links presents alternately disposed wheels with the two sets of alternate wheels being disposed at right angles to one another, said chain being disposed in said housing with said sets of wheels extending parallel respectively to the two cross sectional dimensions of said housing, the diameters of the wheels of the respective sets being slightly less than the corresponding dimension of said housing, said housing having a gap therein at one portion thereof, and drive means for said chain including a rotatable sprocket disposed in driving engagement with said chain at the said gap in said housing, said sprocket including a plurality of pairs of teeth extending from the periphery thereof, said pairs of teeth being circumferentially spaced by a distance equal to the spacing between the wheels on alternate links of said chain, said pairs of teeth each defining a recess therebetween complementary to the periphery of the last-named wheels, said last-named wheels being received within said recesses to establish driving connection between said sprocket and said chain, said sprocket intermediate said pairs of teeth including radially extending ledges disposed in parallel offset relation to the plane of the sprocket, said ledges being disposed for engagement with the periphery of the wheels on the links intermediate said last-named wheels to support and guide said wheels.

7. An endless conveyor comprising an elongated track having curves therein, said track being in the form of a housing of box-like cross section, said housing having a longitudinal slot in the base wall thereof, a chain movably mounted within said housing, said chain comprising a plurality of connected links, each of said links comprising a generally flat unitary link member having a central portion and a loop end portion at each end of said central portion, said central portion having an aperture therethrough transversely of the plane thereof, a wheel shaft journaled in said aperture and extending to either side of said link member, a pair of wheels secured to said shaft, one to each side of said link member in spaced parallel relation to said link member, said wheels being of a diameter greater than the width and less than the length of said link member, each of said loop end portions comprising a generally C-shaped hook joined integrally to said central portion at one end thereof and being spaced from said central portion at the other end thereof to define an opening through which the loop end portion of a similar link may be passed, adjacent links being disposed with the plane thereof at right angles to one another, whereby a chain assembled of said links presents alternately disposed wheels with the two sets of alternate wheels being disposed at right angles to one another, said chain being disposed in said housing with said sets of wheels extending parallel respectively to the two cross sectional dimensions of said housing, the diameters of the wheels of the respective sets being slightly less than the corresponding dimensions of said housing, drive means for said chain, and load supporting members associated with some of the links of the set of links having the wheels thereof disposed vertically and resting on the base wall of said housing, said wheels engaging said base wall on opposite sides of said slot, said load supporting members each comprising a pair of members pivotally connected intermediate their ends and spaced apart at one end thereof, the spaced ends of said members having oppositely disposed transverse slot openings therein receiving the horizontally disposed shaft of the link with which said support is associated on opposite sides of said link, the opposite ends of said members extending through said slot to the exterior of said housing to carry a load exteriorly of said housing, the load being supported solely by said load supporting member, the respective shaft and wheels with which said load supporting member is associated and the base wall of said housing.

8. A link for chain conveyors and the like comprising a generally planar rigid link having a central body portion and a pair of integral fingers extending in opposite directions from said body portion, each of said fingers at the outer end thereof being looped upon itself in an arc in excess of 270 degrees, the end of each finger terminating in spaced relation to the base portion of the finger to define an opening in the loop along one edge of the finger, said opening facing in the direction of said central portion, the spacing between the end of each finger and the adjacent base portion of the finger being less than the thickness of the major portion of the finger, the end of each finger being tapered inwardly from the opposite sides of the link, said loop and opening of each finger accommodating assembly therewith of one finger of an identical link, said fingers being connected solely by disposition of the two links in planes at right angles to one another with the two links offset from a straight line in each of the two planes and with the terminal end of each of said fingers aligned with the opening in the other finger, followed by passage of the terminal end of each of said fingers into the interior of the loop of the other finger and rotation of the two links in an arc substantially greater than 90 degrees in their respective planes with respect to each other, the said fingers of the two links being disconnected solely upon reverse movement of the two links, whereby the said fingers of the two links cannot accidentally become disconnected in any use to which a chain assembled of a plurality of said links may be put.

9. A link for chain conveyors and the like comprising a generally planar oblong unitary rigid link having a generally circular central body portion and a pair of integral fingers extending generally tangentially from said body portion in opposite directions, each of said fingers at the outer end thereof being looped substantially back upon itself in the direction reverse to its tangential extension in an arc in excess of 270 degrees, the end of each finger terminating in spaced relation to the base portion of the finger to define an opening in the loop along one edge of the finger, said opening facing in the direction of said central portion, the spacing between the end of each finger and the adjacent base portion of the finger being less than the thickness of the major portion of the finger, the end of each finger being tapered inwardly from the opposite sides of the link to define a tapering throat to said opening.

10. A link for chain conveyors and the like comprising a generally planar oblong unitary rigid link having a generally circular central body portion and a pair of integral fingers extending generally tangentially from said body portion in opposite directions, each of said fingers at the outer end thereof being looped substantially back upon itself in the direction reverse to its tangential extension in an arc in excess of 270 degrees, the end of each finger terminating in spaced relation to the base portion of the finger to define an opening in the loop along one edge of the finger, said opening facing in the direction of said central portion, the spacing between the end of each finger and the adjacent base portion of the finger being less than the thickness of the major portion of the finger, the end of each finger being tapered inwardly from the opposite sides of the link to define a tapering throat to said opening, said loop and opening of each finger accommodating assembly therewith of one finger of an identical link, said fingers being connected solely by disposition of the two links in planes at right angles to one another with the loop of each of said fingers engaging the base portion of the other finger inwardly of the loop thereof and with the two links offset from a straight line by approximately 30 degrees in each of the two planes and with the terminal end of each of said fingers aligned with the opening in the other finger, followed by passage of the terminal end of each of said fingers into the interior of the loop of the other finger and rotation of the two links approximately 180 degrees in their respective planes with respect to each other, the said fingers of the two links being disconnected solely upon reverse movement of the two links, whereby the said fingers of the two links cannot accidentally become disconnected in any use to which a chain assembled of a plurality of said links may be put.

11. In a chain conveyor adapted to ride within an enclosing track, the combination of a chain movably mounted within said track, said chain comprising a plurality of vertical links and horizontal links occurring in alternating sequence, a pair of vertical wheels carried on opposite sides of each vertical link, horizontal guide wheel means carried on each horizontal link, load carrying means suspended from a plurality of said vertical links, and substantially identical C-shaped hooks extending from opposite ends of both said vertical links and said horizontal links and adapted for coupling said links together, said C-shaped hooks being of substantially circular cross-section, the free end of each C-shaped hook terminating in rigid spaced relation to the base portion of the hook to define a permanently open passageway into the eye of the hook which opens outwardly along one edge of the link, said passageway being of a width less than the diameter of the eye within the hook, less than the circular cross-sectional thickness of the hook, and less than the transverse thickness of the companion connecting link, the terminal end of each C-shaped hook being of reduced section for introduction through said passageway into the eye of the hook when said links are disposed at a predetermined angle to one another in the operation of coupling adjoining links.

References Cited in the file of this patent
UNITED STATES PATENTS

| | | |
|---|---|---|
| 609,153 | Levalley | Aug. 16, 1898 |
| 1,377,800 | Brown | May 10, 1921 |
| 1,676,863 | Kelso | July 10, 1928 |
| 2,372,199 | Hassler | Mar. 27, 1945 |
| 2,446,685 | Barker | Aug. 10, 1948 |